United States Patent [19]

Thomas

[11] 4,038,600
[45] July 26, 1977

[54] POWER CONTROL ON SATELLITE UPLINKS

[75] Inventor: Leslie D. Thomas, Baltimore, Md.

[73] Assignee: Westinghouse Electric Corporation, Pittsburgh, Pa.

[21] Appl. No.: 658,932

[22] Filed: Feb. 17, 1976

[51] Int. Cl.$^2$ .............................................. H04B 7/00
[52] U.S. Cl. ............................................ 325/4; 325/62
[58] Field of Search .................... 325/2, 4, 47, 62, 65, 325/67; 178/DIG. 4

[56] References Cited

U.S. PATENT DOCUMENTS

| | | | |
|---|---|---|---|
| 2,885,470 | 5/1959 | Bartelink | 178/DIG. 4 |
| 3,315,164 | 4/1967 | Ferguson, Jr. et al. | 325/4 |
| 3,487,169 | 12/1969 | Miyagi | 325/62 |

Primary Examiner—Benedict V. Safourek
Attorney, Agent, or Firm—J. B. Hinson

[57] ABSTRACT

A system for controlling the output power of a transmitter which communicates with a remotely positioned receiving station through a "linear" transponder such that the power level of the input signal to the transponder is substantially constant is disclosed. The output signal of the transmitter and the input signal to the transponder includes two carriers having predetermined relative power levels with respect to each other. Typically, one carrier will be 10 dB below the other. Since all linear transponders are slightly non-linear, intermodulation distortion products are generated by the transponder. The intermodulation products and the two carriers are retransmitted to the receiving station by the transponder. The power level of the intermodulation distortion products relative to the low power carrier is measured at the receiving station. From the power level of the intermodulation distortion products and the intermodulation distortion characteristics of the transponder, the power level of the input signal arriving at the transponder is determined and a signal generated to control the power output of the transmitter so that the input signal arriving at the transponder has the desired power level. The carrier having the highest power level is modulated with the data to be transmitted using any convenient modulation technique. The low power carrier is not normally modulated. Its only purpose is to generate the intermodulation products which are used to determine the power level of the input signal to the transponder.

9 Claims, 3 Drawing Figures

POWER CONTROL ON SATELLITE UPLINKS

BACKGROUND OF THE INVENTION

1. Field of the Invention

The invention relates to communications systems and more specifically to communications systems utilizing a linear transponder and the intermodulation products generated by the transponder to produce a control signal for controlling the output power of the transmitter such that the power level of the input signal to the transponder is maintained at the desired level.

2. Description of the Prior Art

Many prior art transponder systems, such as satellite, have utilized carrier frequencies less than 10 gigahertz. These frequencies are not subject to severe fading due to rain showers, for example. Recent developments have indicated the desirability of operating some of the systems in the 10 gigahertz and above frequency range. At these frequencies changes in the attenuation of the signal between the transmitter and the transponder can result in significant variations in the power level of the input signal to the transponder. If the transponder is to operate in the linear mode, that is the power level of the output signal or the transponder has a substantially direct relationship to the power level of the input signal, some system for determining the power level of the input signal to the transponder is required in order to maintain the power level of the output signal of the transponder at the desired level. Additionally, transponders operating in the linear mode such as the CTS satellite may simultaneously handle input signals from different sources. In this situation, it becomes necessary to independently determine the power of each of the input signals as they arrive at the transponder.

Conceptually, instrumentation could be included in the transponder to independently measure the power of each of the input signals as they arrive at the transponder. Obviously this can lead to considerable complexity. In fact, it may even become technically impractical in transponders simultaneously handling a large number of input signals.

SUMMARY OF THE INVENTION

The system which is the subject of this invention provides an indirect method for independently measuring the power level of the signal arriving at the input of a linear transponder. The system is based on the fact that all of the so-called linear transponders are actually slightly non-linear and therefore when an input signal containing more than one frequency is received by the transponder intermodulation distortion products will be generated. For a particular transponder the relationship between the power level of the intermodulation distortion products and the power level of the frequencies included in the input signal can be determined before the transponder is put into operation. In practicing the method disclosed by this application, each transmitting station utilizing the transponder generates a signal comprising two carriers. The power level of these two carrier with respect to each other is maintained substantially constant. In the preferred embodiment, the power lever of one carrier is approximately 10 dB below the other. The carrier having the higher power level is modulated with the information to be transmitted using any conventional modulation technique. The carrier having the lower power level is not modulated. Both carriers are received, amplified and retransmitted by the transponder. Due to the non-linearity of the transponder, the retransmitted signal will include intermodulation products in addition to the two original carriers.

The signal arriving at the receiving station from the transponder is demodulated to recover the data being transmitted. This signal is also analyzed to determine the power level of selected intermodulation products relative to the unmodulated carrier. From the power level of these intermodulation products and the characteristics of the transponder, a signal indicating the power level of the input signal to the transponder is produced. If this signal indicates that the power level of the input signal to the transponder is above or below the desired value, the power output of the transmitter is adjusted to achieve the desired power level for the input signal to the transponder.

Each transmitter utilizing the transponder operates independently. This permits each user to independently determine the power level of his signal as it arrives at the transponder and to independently maintain the power level of this signal at the desired level.

DESCRIPTION OF THE PREFERRED EMBODIMENT

In the preferred embodiment the transponder will operate in the linear mode. By linear it is meant that the power level of the output signal from the transponder will have a substantially direct relationship to the power level of the input signal thereto. However, as a practical matter transponders are not perfectly linear. When an input signal which includes at least two carriers within the bandwidth of the transponder arrives at the transponder, the non-linearity of the transponder will generate intermodulation distortion products. The amplitude of the intermodulation distortion products is related to the amplitude of the carriers.

Figure 1:
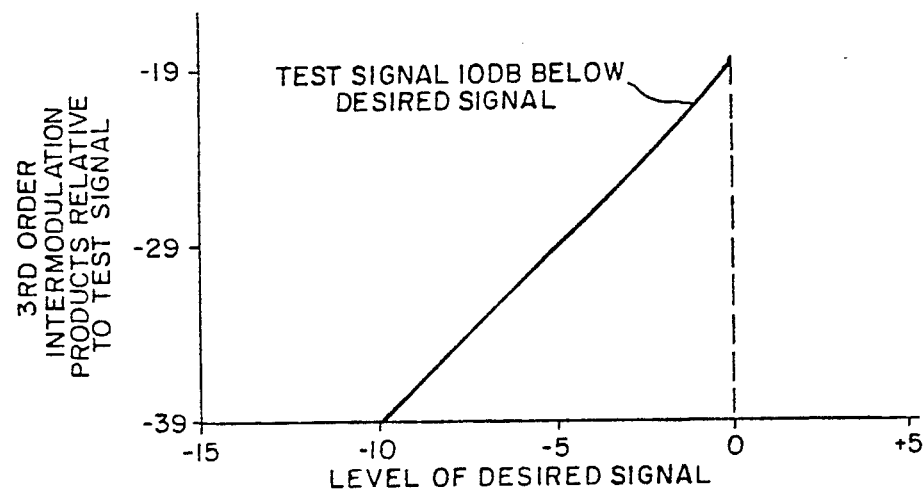
FIG. 1 is a curve showing the relationship between the power level of the input signal to the transponder and the intermodulation products generated by the transponder.

FIG. 1 illustrates the magnitude of the third order intermodulation distortion products which are generated when and input signal which includes two carriers is received by the transponder with the power level of one of the signals being approximately 10 dB below the other. These intermodulation distortion products are transmitted as a part of the output signal of the transponder. In the system disclosed, the high power carrier would be modulated with the information to be transmitted. The only purpose of the lower power carrier is to generate the intermodulation distortion products which are measured at the receiving station to determine the power level of the carriers as they arrive at the transponder.

Referring to FIG. 1 it can be seen that if the power level of the input signal to the transponder is 0 dB, (0 dB is the desired power level for the input signal to the transponder) the magnitude of the third order intermodulation product is approximately −19 dB. Correspondingly, input signals having power levels of −5 and −10 dB respectively correspond to intermodulation products having power levels of −29 and −39 dB. The important thing to note from this curve is that a specific power level of the input signal to the transponder results in a specific power level for the third order intermodulation products. This characteristic permits the power level of the third order intermodulation products to be used as an indication of the power level of the input signal to the transponder.

The frequency of the intermodulation products that are generated when two carriers of different frequencies are passed through a slightly non-linear circuit such as a transponder are well known in the art, and therefore will not be discussed in detail here. However, since it has been indicated that the amplitude of the third order intermodulation product is to be used to determine the power level of the input signal to the transponder, it is appropriate to point out that the third order intermodulation product is composed of signals of four basic frequencies. Using the notation of F1 to represent the frequency of the high power carrier which is modulated with the information to be transmitted and F2 to represent the freqency of the low power carrier intermodulation products having frequencies of 2F1 +F2, 2F1 − 2F2, 2F2 + F1, and 2F2 − F1 are generated.

The proposed CTS (Communications Technology Satellite) is a typical example of a linear transponder suitable for use in the disclosed system. The CTS satellite will receive and transmit signals in the range of 12 to 14 gigahertz. A typical application using this satellite would utilize a 12.5 gigahertz carrier which would be modulated with the data to be transmitted. The lower power test carrier would have a frequency either 10 kilohertz above or below 12.5 gigahertz. For example, if the carrier modulated with the information to be transmitted has a frequency of 12.5 gigahertz and the lower power carrier has a frequency 10 kilohertz either above or below 12.5 gigahertz, the third order intermodulation products having the form of 2F1 − F2 and 2F2 − F1 are within the bandpass of the satellite and are received at the receiving station while the other components of the third order intermodulation products are outside the bandpass of the satellite and consequently are not received by the receiver.

Figure 2:
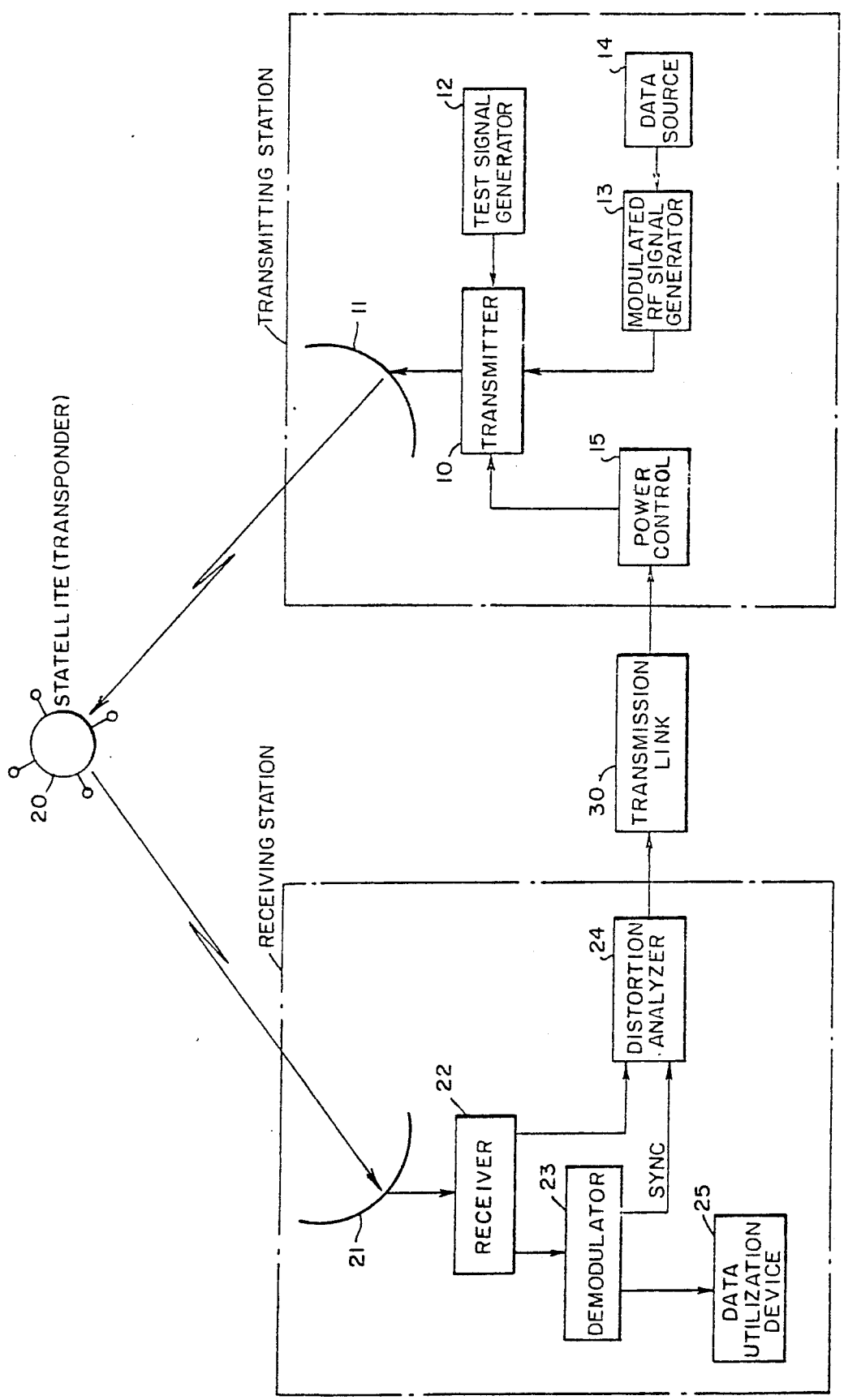
FIG. 2 is a block diagram of the preferred embodiment of the system.

FIG. 2 is a block diagram of the preferred embodiment of the power control system which is the subject of this invention. In most cases the transmitting and receiving stations will be positioned at separate locations and the orientation of the antennas of the transponder 20 will be much that the return signal or down link signal from the transponder 20 cannot be received at the transmitting station. In this case, the transmission link 30 coupling the receiving station to the transmitting station can be a reverse channel via the transponder 20. The reverse channel requires a transmitting station and a receiving station at each location. Alternatively, transmission link 30 may be a conventional communications link, such as a telephone network.

A typical transmitting station consists of a transmitter 10 which is capable of transmitting a signal which includes the carrier modulated with the information to be transmitted and the low power carrier. The output of the transmitter 10 is coupled to an antenna 11 which is aimed at the transponer 20.

Information to be transmitted is generated by a data source 14. The output of the data source 14 is ouled to a modulated RF signal generator 13 to produce a carrier modulated with the data to be transmitted. Test signal generator 12 generates an unmodulated carrier. The modulated and unmodulated carriers are coupled to the transmitter 10. The power level of the output signals of the test signal generator 12 and the modulated RF signal generator 13 is selected such that at the output of transmitter 10 the modulated carrier has a power level 10 dB higher than the unmodulated carrier. The output signal of the transmitter 10 is coupled to an antenna 11 and transmitted to the transponder 20. Power control circuit 15 controls the power level of the output signal of transmitter 10 to maintain the power level of the input signal to the transponder 20 at the desired level. The output signal from transmitter 10 arriving at the transponder 20 is amplified and retransmitted to the receiving station which may be geographically separated from the transmitter station by a considerable distance.

A typical ground station includes an antenna 21 for receiving the output signal from the transponder 20. The antenna 21 is coupled to a receiver 22. The output signal of the receiver 22 is coupled to a demodulator 23 which recovers the data being transmitted and couples this data to a utilization device 25. Additionally, the output of the receiver 22 is coupled to the input of an intermodulation distortion analyzer 24. Intermodulation distortion analyzer 24 measures the power level of the third order intermodulation products to determine the power level of the input signal to the transponder 20. Basically this determination is made by measuring the amplitude of the third order intermodulation products and comparing this amplitude to the curve illustrated in FIG. 1 to determine the power level of the input signal to the transponder 20. A signal indicating the power level of the input signal to the transponder 20 is coupled by a transmission link 30 to the power control 15, which is located at the transmitting station. In response to this control signal the power control system 15 adjusts the power output on the transmitter 10 to maintain the power level of the input signal to the transponder 20 at the desired level. Transmission link 30 may be a part of a communications link in the reverse direction via transponder 20 or a conventional communication link such as a telephone network.

Additionally in systems such as TV systems where the low power carrier may not be continuously transmitted, the demodulator 23 generates a sync signal which is coupled to the distortion analyzer 24 to determine the time period when the distortion measurements are made.

Figure 3:
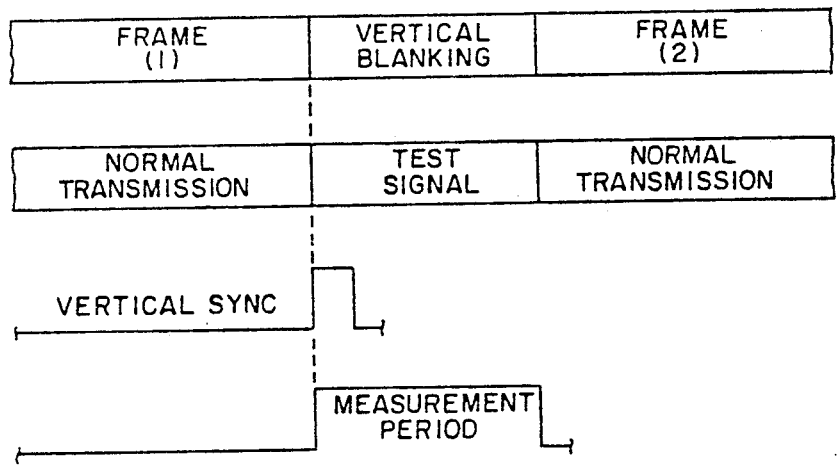
FIG. 3 is a timing chart illustrating how the power level of the input signal to the transponder may be determined during the vertical blanking period of a conventional TV signal.

It is well known that in television systems there are periods during which video information is not being transmitted. Specifically, these periods are the vertical and horizontal blanking periods. FIG. 3 is a timing chart illustrating how the test signal generator 12 can be turned on or off so that the low power carrier is only transmitted during times when no video information is being transmitted thereby assuring that the intermodulation products cannot interfere with the video information.

The first line of FIG. 3 illustrates the transmission of two frames of a standard TV picture with a vertical blanking period interposed therebetween. This is the standard format of all video TV signals. During the frame period normal video transmission occurs. During the vertical blanking period the test signal generator 12 is turned on so that both the high and low power carriers are transmitted. The vertical sync pulse occurs at the beginning of the vertical blanking period. This pulse, illustrated in line 3 of FIGS. 3, can be conveniently recovered by the demodulator 23. This sync signal is then coupled to the intermodulation distortion analyzer 24 to establish the time period during which third order intermodulation products are to be measured. The measurement period initiated by the vertical sync pulse is illustrated in line 4 of FIG. 3.

In the system described above the third order intermodulation products are only available during the blanking periods because this is the only periods tha the low power carrier is transmitted. During the other time periods there is no data available to determine the power level or the input signal to the transponder. These periods during which no input signal power level data is available limits rate at which the power output of the transmitter 10 can be changed to compensate for up link attenuation changes. In all cases, the blanking rate must be at least twice the rate of the attenuation changes to be compensated for. This is a well-known principal of sampled data systems.

Transponder systems operating in the high gigahertz range normally have relatively slow changes in signal attenuation permitting the above-described TV system to be conveniently utilized. However, if the system parameters require the intermodulation distortion measurements to be continuously made in order to adequately control the output power of the transmitter, the low power carrier can be continuously transmitted because the power level of this signal can be as much as 10 dB below the modulated carrier thus limiting the third order intermodulation products to a level sufficiently low that they do not unreasonably degrade the data being transmitted. Control for rapid changes in attenuation may be limited to terrestrial systems due to the propagation time which may be as high as 0.6 seconds for systems using a geostationary satellite as a transponder.

It should also be pointed out that the transmitter 10 simultaneously transmits both the high and low power carriers. This means that intermodulation products are generated in the transmitter 10 as well as the transponder 20. This does not cause any severe problems because the transmitter 10 will probably be operating below its peak power capability in order to assure adequate margins for control. This limits the transmitter intermodulation distortion. Additionally, the intermodulation distortion characteristic of the transmitter 10 are known and compensation for this characteristic can be incorporated in the power control 15.

It will be obvious to those skilled in the art that the system illustrated in FIG. 2 can be assembled using either commercially available apparatus or apparatus which is well known in the art. For example, the functions performed by receiving antenna 21, receiver 22, and demodulator 23 can be performed by conventional satellite ground stations. The necessary third order intermodulation distortion analysis may be performed by currently available distortion analyzers.

Test signal generator 12 may be any conventional RF signal generator generating a carrier at the desired frequency and power level. Transmitter 10 may be a conventional linear RF amplifier having sufficient bandwidth to simultaneously transmit the output signal of the test signal generator 12 and the modulated signal generator 13. The modulated signal generator 13 can be any conventional RF signal generator capable of being modulated by the data source 14. Power control circuit 14 may be a comparator that compares the magnitude of the intermodulation products to a signal indicating the desired value and adjusts the output of transmitter 10 to achieve this value. This is a simple control circuit and can be designed by any skilled circuit designer.

Transmission link 30 can be any communications means capable of transmitting the output signal of the distortion analyzer 24 to the power control circuitry 15. For example, it may be a reverse channel via transponder 20, a telephone network, or perhaps even a teletype network. In general, this link will be carried via transponder 20 as a subcarrier on this return link. However, it may be sent by other convenient means.

I claim as my invention:

1. A system for controlling the power level of the output signal of a transmitter which communicates with a receiver via a transponder such that the power level of the signal arriving at the input of said transponder has the desired level, comprising in combination:

transmitter means for generating and transmitting a signal comprising first and second carriers;

transponder means for receiving said signal and for retransmitting selected intermodulation products produced by said transponder;

receiving means for receiving said selected intermodulation products;

distortion analyzer means coupled to said receiving means for analyzing said selected intermodulation products to produce a control signal related to the magnitude of said signal at the input of said transponder; and power control means responsive to said control signal for adjusting said transmitter so that said signal has the desired level as measured at the input of said transponder.

2. A system in accordance with claim 1 wherein said first and second carriers are retransmitted by said transponder.

3. A system in accordance with claim 2 wherein the relative power levels of said first and second carriers are selected such that the power level of said intermodulation distortion products will be low.

4. A system in accordance with claim 1 wherein said first carrier is modulated by said transmitting means with a video signal in conventional TV format.

5. A system in accordance with claim 4 wherein said transmitting means includes means for controlling said second carrier such that said second carrier is only transmitted during the vertical banking interval of said video signal.

6. A system in accordance with claim 1 wherein said transmitting means and said receiving means are positioned at first and second geographically separated locations.

7. A system in accordance with claim 6 wherein said signal indicative of the magnitude of said signal is transmitted from said receiving station to said transmitting station via a telephone network.

8. A system in accordance with claim 1 wherein the frequency of said first carrier is greater than 10 GHz.

9. A system in accordance with claim 1 wherein said control signal indicative of the magnitude of said signal is transmitted from said receiving station to said transmitting station via a return link utilizing said transponder.

* * * * *